(12) United States Patent
Kobayashi

(10) Patent No.: US 6,496,467 B1
(45) Date of Patent: Dec. 17, 2002

(54) OPTICAL PICKUP

(75) Inventor: Shohei Kobayashi, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 195 days.

(21) Appl. No.: 09/592,389

(22) Filed: Jun. 13, 2000

(30) Foreign Application Priority Data

Jun. 14, 1999 (JP) .......................................... 11-167166

(51) Int. Cl.[7] ................................................ G11B 7/00
(52) U.S. Cl. ............................... 369/112.29; 369/44.15
(58) Field of Search .......................... 369/44.14, 44.15, 369/44.22, 44.23, 126, 43, 112.23, 112.24, 112.29, 112.28, 119; 359/642, 656

(56) References Cited

U.S. PATENT DOCUMENTS

| 5,235,591 | A | * | 8/1993 | Nakamura et al. | ........... 369/199 |
| 5,247,503 | A | * | 9/1993 | Nomiyama et al. | ...... 369/44.15 |
| 5,828,644 | A | * | 10/1998 | Gage et al. | ............. 369/44.14 |
| 6,044,056 | A | * | 3/2000 | Wilde et al. | ........... 369/112.29 |
| 6,061,323 | A | * | 5/2000 | Jerman et al. | ......... 369/112.29 |
| 6,154,326 | A | * | 11/2000 | Ueyanagi et al. | ............. 369/43 |
| 6,181,478 | B1 | * | 1/2001 | Mandella | ..................... 359/642 |
| 6,229,782 | B1 | * | 5/2001 | Wang et al. | ........... 369/112.29 |
| 6,304,527 | B1 | * | 10/2001 | Ito et al. | ..................... 369/126 |

FOREIGN PATENT DOCUMENTS

| JP | 5-73946 | 3/1993 |
| JP | 07065383 A | * 3/1995 |

* cited by examiner

Primary Examiner—Thang V. Tran
(74) Attorney, Agent, or Firm—Frishauf, Holtz, Goodman & Chick, P.C.

(57) ABSTRACT

An optical pickup comprises a light source section for emitting a light beam, a floating objective lens for focusing the light beam on an optical disk, a galvano-mirror capable of directing the light beam toward the objective lens and rockable for tracking control, a beam splitter for extracting return light from the optical disk, and a photodetector for detecting return light. The floating objective lens includes a lens for converging the light beam and a slider for holding the lens. The slider is lifted off the optical disk by means of air currents produced as the disk rotates. The galvano-mirror is located adjacent to the objective lens. In other words, the objective lens in a floating state is situated close to the galvano-mirror without intercepting the light beam incident upon the galvano-mirror.

4 Claims, 4 Drawing Sheets

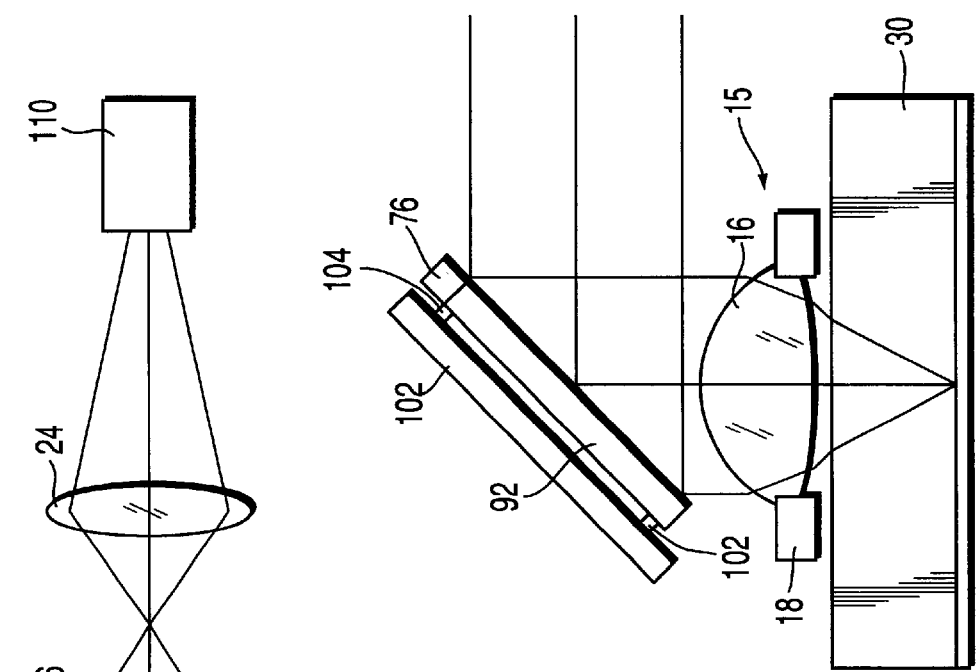
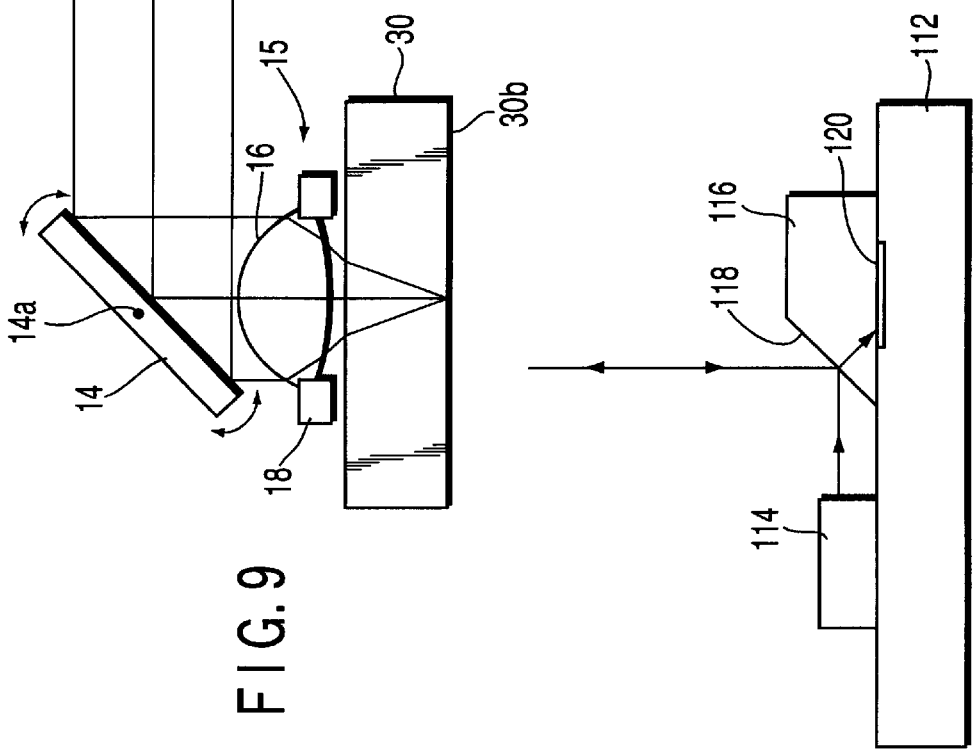

OPTICAL PICKUP

CROSS-REFERENCE TO RELATED APPLICATIONS

This application is based upon and claims the benefit of priority from the prior Japanese Patent Application No. 11-167166, filed Jun. 14, 1999, the entire contents of which are incorporated herein by reference.

BACKGROUND OF THE INVENTION

The present invention relates to an optical pickup for recording on and reproducing information from an optical disk.

As an example of a thin-type optical pickup, there is an optical pickup including a floating objective lens, which is lifted off an optical disk by means of air currents. Since the floating objective lens is very small, a small-diameter light beam may be used, so that the optical pickup using the floating objective lens can be thinned.

An example of an optical pickup using a floating objective lens is described in Jpn. Pat. Appln. KOKAI Publication No. 5-73946. This optical pickup comprises a floating objective lens adapted to be lifted off by means of air currents produced as an optical disk rotates, a light source for emitting a light beam, and a reflecting prism, so-called riser mirror, for deflecting the light beam at 90° to direct it to the objective lens. The optical pickup further comprises a relay lens system including two lenses and interposed between the light source and the riser mirror. The lens on the light source side is movable at right angles to the optical axis for tracking control; while the lens on the riser mirror side is movable along the optical axis for focus control.

When the lens for tracking control is moved at right angles to the optical axis, its focal point is deviated from the optical axis. Accordingly, the light beam projected from this lens has an inclination to the optical axis. After it is reflected by the riser mirror, therefore, the light beam falls on the objective lens at an angle to the optical axis of the lens. In consequence, the light beam is focused on the optical disk at a position, which is off the optical axis of the objective lens. Tracking control is carried out in this manner.

The light beam thus inclined with respect to the optical axis for tracking control recedes from the optical axis on departing from the lens for tracking control. Accordingly, the riser mirror should have a certain measure of area, and the objective lens is expected to have a corresponding effective diameter.

These requirements entail an increase in size of the riser mirror and the objective lens and constitute a hindrance to the reduction in thickness of the optical pickup.

BRIEF SUMMARY OF THE INVENTION

The present invention has been contrived in consideration of these circumstances, and its object is to provide a thin-type optical pickup in which a riser mirror and an objective lens are reduced in size.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 8 shows the way the galvano-mirror of FIG. 7A is located adjacent to the floating objective lens;

FIG. 9 schematically shows a configuration of an optical pickup according to a second embodiment of the invention; and FIG. 10 shows a configuration of a unit shown in FIG. 9.

DETAILED DESCRIPTION OF THE INVENTION

First Embodiment

A first embodiment of the present invention will now be described with reference to FIGS. 1 to 8.

Figure 1:
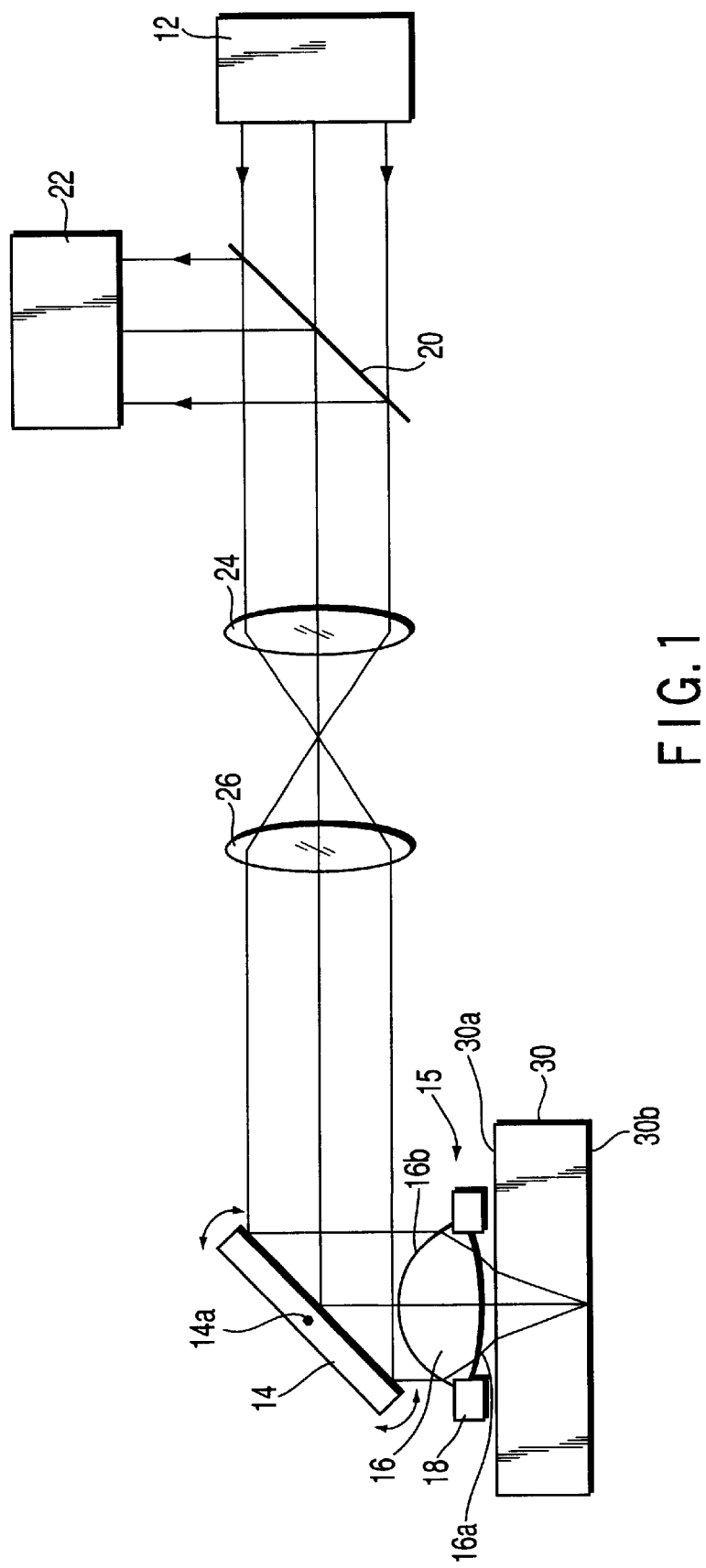
FIG. 1 schematically shows a configuration of an optical pickup according to a first embodiment of the present invention.

As shown in FIG. 1, an optical pickup comprises a light source section 12 for emitting a parallel light beam, a floating objective lens 15 for focusing the light beam, a galvano-mirror 14 capable of directing the light beam toward the lens 15 and rockable for tracking control, a beam splitter 20 for extracting return light from an optical disk 30, and a photodetector 22 for detecting the return light. In FIG. 1, the light source section 12 and the photodetector 22 are shown as being located on different height levels for simplicity of illustration. Actually, however, they are arranged on the same height level, that is, within a plane perpendicular to the axis of the objective lens 15.

The optical pickup further comprises a relay lens system between the beam splitter 20 and the galvano-mirror 14. The lens system includes two coaxial lenses 24 and 26 arranged along the optical axis. The distance between the two lenses 24 and 26 can be changed for focus control. If the focus control is unnecessary, the relay lens system may be omitted.

The floating objective lens 15 comprises a lens 16 for converging the light beam and a floatable slider 18 for holding the lens 16. The slider 18 is lifted off the optical disk 30 by means of air currents, which are produced as the disk 30 rotates. While the optical disk 30 is rotating, therefore, the lens 16 is located at a fixed distance from the disk 30.

The galvano-mirror 14, which is situated over the floating objective lens 15, directs the light beam from the relay lens system toward the lens 15. Thus, the galvano-mirror 14 serves as a so-called riser mirror. The riser mirror described herein is a mirror, prism, or some other optical element that directs the light beam toward the objective lens 15. The galvano-mirror 14 is expected only to have a mirror surface, which can reflect the incident light beam. Further, the galvano-mirror 14 is rocked around an axis 14a for tracking control.

After the light beam emitted from the light source section 12 passes through the relay lens system, it is deflected at 90° by the galvano-mirror 14 and falls on the floating objective lens 15. Then, the incident light beam is focused on an information recording surface 30b by means of the lens 16. Return light reflected by the recording surface 30b of the disk 30 returns along a return path and passes through the objective lens 15, galvano-mirror 14, and relay lens system. Thereafter, the return light is selectively reflected by the beam splitter 20 and advances toward the photodetector 22.

An information signal, tracking error signal, and focus error signal are obtained in accordance with information detected by means of the photodetector 22. Based on the tracking error signal, the swing angle of the galvano-mirror 14 is controlled. The angle of incidence of the light beam on the lens 16 changes according to the swing of the galvano-mirror 14. Thereupon, tracking control is effected as a focal point on the information recording surface 30b of the optical disk 30 moves.

The focus is shifted as the flying height of the lens 16, the thickness and refractive index of a protective layer of the optical disk 30, the wavelength of the light beam, etc. vary. Based on the focus error signal, at least one of the lenses 24 and 26 is moved along the optical axis to adjust the distance between the two lenses, whereupon focusing is permitted.

In the optical pickup of the present embodiment, the lens 16 can be designed to be compact in a manner such that it is floated narrowly above the optical disk 30, that is, the working distance is short.

If the flying height or working distance (distance between a surface 30a of the optical disk 30 and a disk-side surface 16a of the lens 16), the thickness of the protective layer of the disk 30 (distance between the surface 30a of the disk 30 and the information recording surface 30b of the disk 30), and the numerical aperture of the lens 16 are 0.1 mm, 1.2 mm, and 0.53, respectively, the lens 16 can be designed so that its thickness and the beam diameter are 0.9 mm and 1.4 mm, respectively.

In the optical pickup of the present embodiment, the galvano-mirror 14 is located adjacent to the floating objective lens 15. This implies that the objective lens 15 in a floating state is situated close to the galvano-mirror 14 without intercepting the light beam incident upon the galvano-mirror 14.

In the present embodiment, the distance between a galvano-mirror-side surface 16b of the floating lens 16 and the center of the galvano-mirror 14, that is, the distance between the top of the floating lens 16 and the center of the galvano-mirror 14, is greater than but approximate to half of the effective diameter of the incident light beam.

In other words, the aforesaid state is a state in which the lens 16 and the galvano-mirror 14 are arranged at a distance from each other such that the light beam cannot be vignetted by the lens 16 when the galvano-mirror 14 is swung for tracking control.

For example, the distance between the lens 16 and the galvano-mirror 14 is adjusted to a value not greater than the diameter of the light beam incident upon the galvano-mirror 14. In the lens 16 designed in the aforesaid manner, the distance is adjusted to 1.4 mm or less. When the galvano-mirror 14 is swung once, the light beam tilts at 2 degrees, so that the deviation of the light beam on the surface 16b of the lens 16 is equal to tan2°×1.4 mm=0.049 mm or less.

Thus, if the galvano-mirror 14 is located adjacent to the floating objective lens 15, the galvano-mirror 14 and the lens 15 can be made compact, so that a thin-type optical pickup can be obtained.

In the design example described above, the thickness of the protective layer of the optical disk 30 (distance between the surfaces 30a and 30b) is 1.2 mm. If the thickness of the protective layer of the disk 30 is reduced, the floating objective lens and the galvano-mirror can be made smaller, so that a thinner optical pickup can be obtained. A great effect can be produced if the thickness of the protective layer of the optical disk 30 (distance between the surfaces 30a and 30b) is adjusted to 0.6 mm or less. Further, the thickness of the protective layer of the disk 30 may be reduced to 0 (no protective layer).

Figure 2:
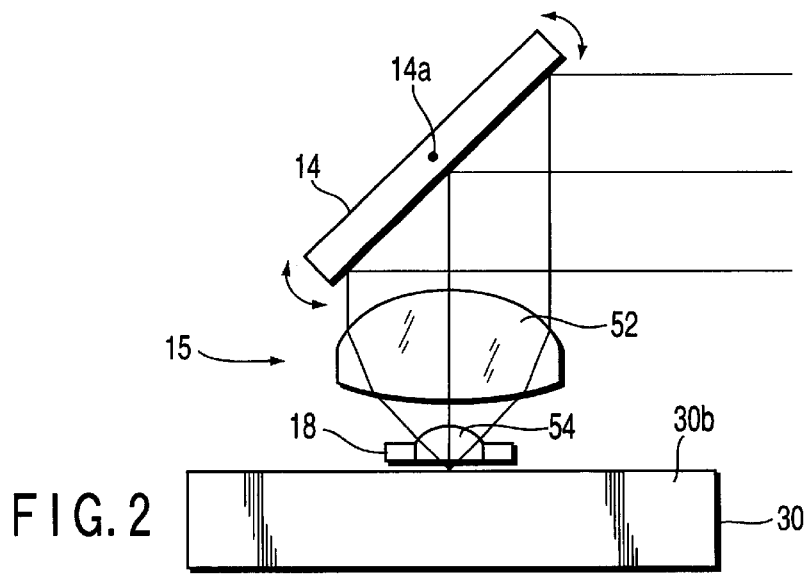
FIG. 2 shows a modification of a floating objective lens applicable to the optical pickup of the FIG. 1.

FIG. 2 shows a modification of the floating objective lens 15. As shown in FIG. 2, the objective lens 15 comprises two lenses 52 and 54, which are arranged coaxially with each other. The lens 52 nearer to the galvano-mirror 14 pre-focuses the light beam, while the lens 54 farther from the galvano-mirror 14 focuses the pre-focused light beam. The objective lens 15 further comprises a slider for holding the disk-side lens 54. The slider is lifted off by means of air currents, which are produced as the optical disk 30 rotates. Naturally, both the lenses 52 and 54 may be held by means of the floatable slider 18. The thickness of the protective layer of the optical disk 30 is 0 (i.e., no protective layer), and the flying height is 0.001 mm or less.

In this modification, the galvano-mirror 14 is located adjacent to the floating objective lens 15. This implies that the distance between the galvano-mirror-side surface of the lens 52, which is nearer to the galvano-mirror 14, and the center of the galvano-mirror, that is, the distance between the top of the lens 52 and the center of the galvano-mirror 14, is greater than but approximate to half of the effective diameter of the light beam incident upon the galvano-mirror 14. For example, the distance between the top of the lens 52 and the center of the galvano-mirror 14 is adjusted at least to a value not greater than the diameter of the light beam incident upon the galvano-mirror 14.

Figure 3:
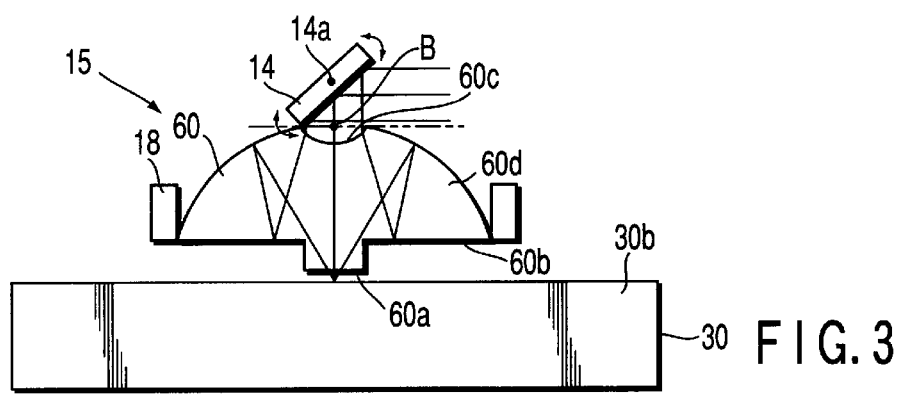
FIG. 3 shows another modification of the floating objective lens applicable to the optical pickup of the FIG. 1.

FIG. 3 shows another modification of the floating objective lens 15. As shown in FIG. 3, the objective lens 15 is provided with a lens 60 for converging the light beam and a slider for holding the lens 60. The slider is lifted off by means of air currents, which are produced as the optical disk 30 rotates. The lens 60 has a circular first flat surface 60a in the center and a second flat surface 60b surrounding the surface 60a, on the optical disk side. On the opposite side, the lens 60 has a concave surface 60c in the center and a curved side face 60d surrounding the surface 60c.

The light beam from the galvano-mirror 14 falls on the concave surface 60c of the lens 60, propagates as divergent light in the lens 60, and is reflected by the second flat surface 60b. After the light beam is then reflected by the side face 60d, it passes through the first flat surface 60a, and is converged on the information recording surface 30b of the optical disk 30.

In this modification, the galvano-mirror 14 is located adjacent to the floating objective lens 15. This implies that the distance from a point B of intersection of the optical axis and a plane that passes through the concave surface 60c of the lens 60 to the center of the galvano-mirror 14 is greater than but approximate to half of the effective diameter of the light beam incident upon the galvano-mirror 14. For example, the distance between the intersection point B and the center of the galvano-mirror 14 is adjusted at least to a value not greater than the diameter of the light beam incident upon the galvano-mirror 14.

Preferably, the galvano-mirror comprises a micromachine mirror, which, including its drive system, can be easily manufactured as a compact structure by the semiconductor manufacturing technique. A thin-type optical pickup can be obtained as the galvano-mirror 14 comprises the micromachine mirror.

Figure 4:
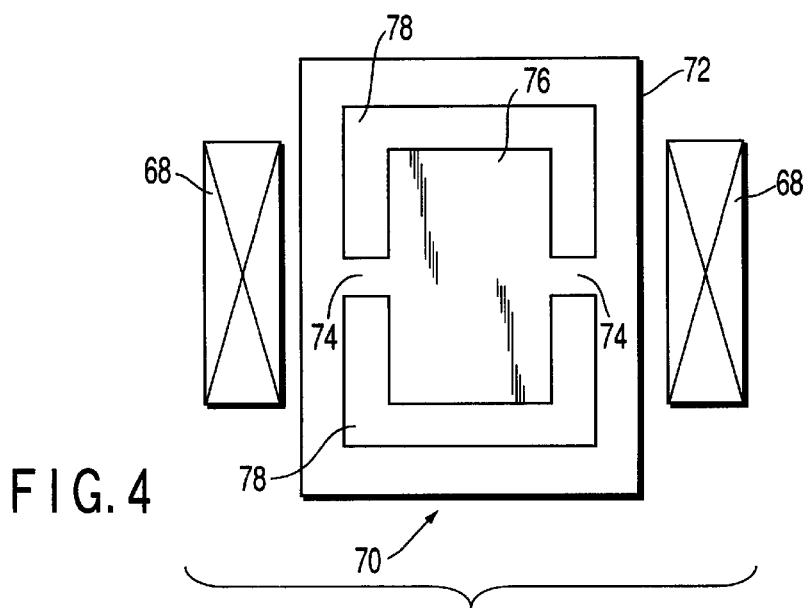
FIG. 4 shows an example of a galvano-mirror comprising a micromachine mirror.

FIG. 4 shows an example of a galvano-mirror, which comprise a micromachine mirror. As shown in FIG. 4, the galvano-mirror comprises a mirror structure 70 and a pair of permanent magnets 68 for driving the structure 70. The mirror structure 70 includes a mirror portion 76, a frame 72 surrounding the mirror portion, and a pair of torsion bars 74 coupling the mirror portion 76 to the frame 72 for rocking motion. The mirror structure 70 is manufactured in a manner such that a pair of U-shaped openings 78 are formed in a rectangular semiconductor substrate.

A driving coil is arranged on the back surface of the mirror portion 76 by means of a semiconductor manufacturing process. When current is supplied to the driving coil, a magnetic field is generated. Thereupon, the coil, in conjunction with the permanent magnets 68, electromagnetically drives the mirror portion 76. Since the driving coil is formed thin on the back surface of the mirror portion 76, the galvano-mirror, including its drive system, can be miniaturized, so that a thin-type optical pickup can be obtained.

Figure 5:
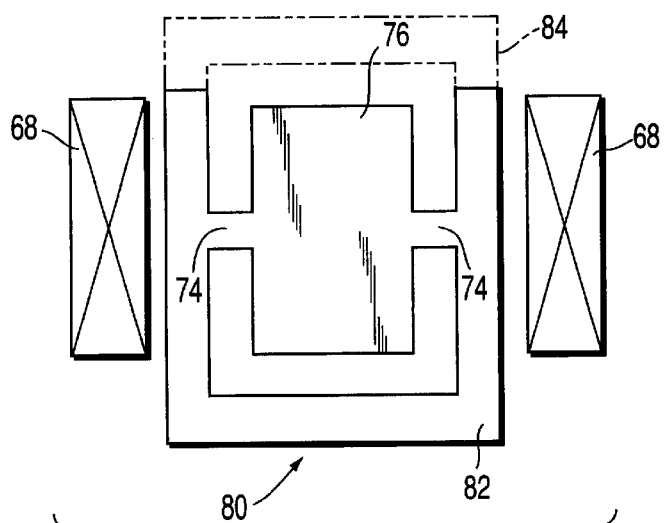
FIG. 5 shows another example of the galvano-mirror comprising a micromachine mirror.
Figure 6:
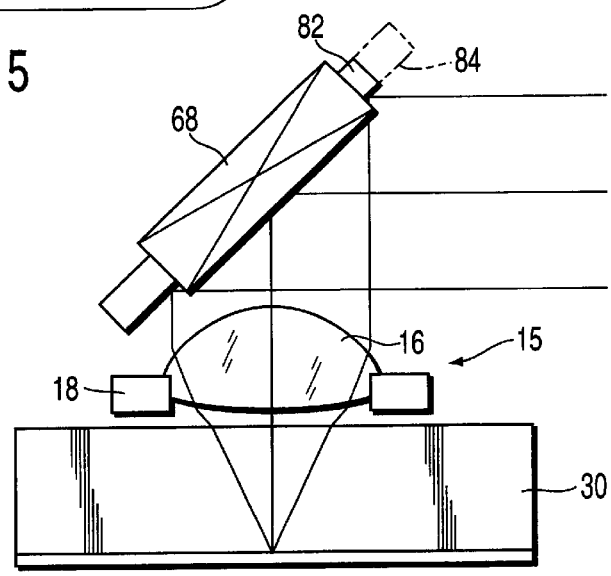
FIG. 6 shows the way the galvano-mirror of FIG. 5 is located adjacent to the floating objective lens.

FIGS. 5 and 6 show another example of a galvano-mirror, which comprises a micromachine mirror. As shown in FIG. 5, the galvano-mirror comprises a mirror structure 80 and a pair of permanent magnets 68 for driving the structure 70. The mirror structure 80 includes a mirror portion 76, a U-shaped frame 82 surrounding the mirror portion, and a pair of torsion bars 74 coupling the mirror portion 76 to the frame 82 for rocking motion.

The mirror structure 80 is obtained by cutting a part (i.e., portion 84 indicated by imaginary line) of the frame from the foregoing mirror structure 70. A driving coil is arranged on the back surface of the mirror portion 76. The mirror portion 76 is electro-magnetically driven as current is supplied to the driving coil.

As seen from FIG. 6, the resulting optical pickup is thinner than the galvano-mirror shown in FIG. 4 by a margin corresponding to the cut upper part of the frame.

Figure 7A:
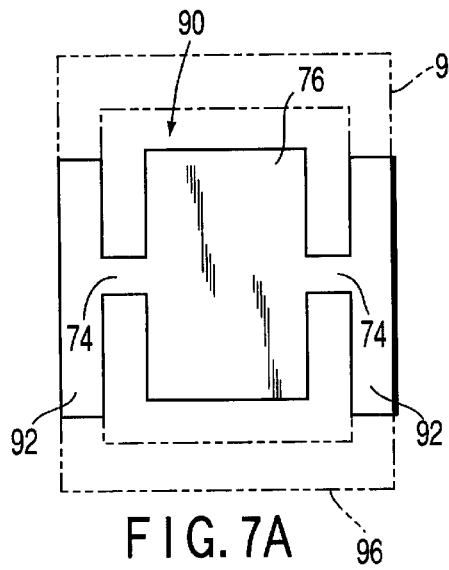
FIG. 7A is a side view showing still another example of the galvano-mirror comprising a micromachine mirror.
Figure 7B:
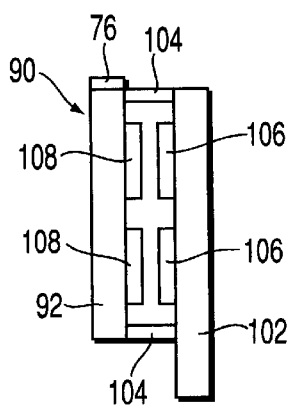
FIG. 7B is a front view of the mirror structure shown in FIG. 7A.

FIGS. 7A, 7B and 8 show still another example of a galvano-mirror, which comprises a micromachine mirror. As shown in FIG. 7A, the galvano-mirror comprises a mirror structure 90. As shown in FIG. 7B, the mirror structure 90 includes a mirror portion 76, a pair of frames 92 on the opposite sides of the mirror portion 76, and a pair of torsion bars 74 coupling the mirror portion 76 to the frames 92 for rocking motion.

The mirror structure 90 is obtained by cutting the upper part (i.e., portion 94 indicated by imaginary line) and the lower part (i.e., portion 96 indicated by imaginary line) of the frame from the foregoing mirror structure 70.

As shown in FIG. 7A, each frame 92 of the mirror structure 90 is fixed to a semiconductor substrate 102 by means of spacers 104. The substrate 102 is provided with electrodes 106. The mirror portion 76 has driving electrodes 108, which are opposed to the electrodes 106, individually. When voltage is applied to the electrodes 106, the mirror portion 76 is driven electrostatically. Since this galvano-mirror is of the electrostatically-operated type, it does not require use of permanent magnets, which are essential to the electromagnetically-operated type.

As shown in FIG. 8, the use of the micromachine mirror of the electromagnetically-operated type facilitates the manufacture of a small-sized galvano-mirror, including its drive system, and therefore, a thin-type optical pickup.

Second Embodiment

A second embodiment of the invention will now be described with reference to FIGS. 9 and 10. In FIG. 9, members indicated by the same reference numerals as the first embodiment refer to the equivalent members, and a detailed description of those members is omitted.

As shown in FIG. 9, an optical pickup of the present embodiment comprises a unit 110, which includes a light source section for emitting a parallel light beam and a photodetector for detecting return light. As shown in FIG. 10, the unit 110 includes a semiconductor substrate 112, a semiconductor laser.114 mounted on the substrate 112, and a micro-prism 116 on the substrate 112. The micro-prism 116 has a half-mirror surface 118, which deflects a light beam emitted from the semiconductor laser 114 and selectively guides return light to a photodetector 120.

As shown in FIG. 9, the optical pickup further comprises a floating objective lens 15 for focusing the light beam, a galvano-mirror 14 for directing the light beam toward the lens 15, and a relay lens system including two lenses 24 and 26 located between the lens 15 and the mirror 14.

The light beam emitted from the semiconductor laser 114 is reflected by the half-mirror surface 118 of the micro-prism 116 and gets out of the unit 110. As shown in FIG. 9, the light beam from the unit 110 becomes a parallel light beam as it passes through the relay lens system including the two lenses 24 and 26. After it is reflected by the galvano-mirror 14, the parallel light beam is focused on the information recording surface 30b of the optical disk 30 by the floating objective lens 15.

The return light from the information recording surface 30b of the optical disk 30 is collected by on the floating objective lens 15 and is reflected by the galvano-mirror 14. Thereafter, it passes through the relay lens system and reaches at the unit 110. The return light incident upon the unit 110 is refracted by the half-mirror surface 118 of the micro-prism 116 and falls on the photodetector 120.

As in the foregoing embodiment, an information signal, tracking error signal, and focus error signal are obtained in accordance with information detected by means of the photodetector 120.

According to the present embodiment, the light source section (i.e., semiconductor laser 114) and the photodetector 120 are included in one integrated unit, so that the resulting optical pickup is further smaller and thinner.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical pick-up for recording and reading information to/from an optical disk, said optical pick-up comprising:

a light source for emitting a light beam, a floating objective lens for focusing the light beam, a galvano-mirror which is located adjacent to the floating objective lens for directing the light beam toward the objective lens, and which is rockable for tracking control, and a photodetector for detecting return light from the optical disk, wherein the galvano-mirror comprises a micromachine mirror and a drive system which are capable of being manufactured as a compact structure by a semiconductor manufacturing technique, and wherein the micromachine mirror comprises a rockable mirror portion, a U-shaped frame at least partially surrounding the mirror portion, and a pair of torsion bars coupling the mirror portion to the U-shaped frame for rocking motion.

2. An optical pickup according to claim 1, wherein the micromachine mirror further comprises a substrate having electrodes, and wherein the rockable mirror portion comprises individual driving electrodes opposed to the electrodes of the substrate, so that the mirror portion is rockable by electrostatic operation.

3. An optical pickup for recording and reading information to/from an optical disk, said optical pick-up comprising:

a light source for emitting a light beam, a floating objective lens for focusing the light beam, a galvano-mirror which is located adjacent to the floating objective lens for directing the light beam toward the objective lens, and which is rockable for tracking control, and a photodetector for detecting return light from the optical disk, wherein the galvano-mirror comprises a micromachine mirror and a drive system which are capable of being manufactured as a compact structure by a semiconductor manufacturing technique, and wherein the micromachine mirror comprises a rockable mirror is portion, a pair of frames respectively provided on opposite sides of the mirror portion, and a pair of torsion bars respectively coupling the mirror portion to the pair of frames for rocking motion.

4. An optical pickup according to claim 3, wherein the micromachine mirror further comprises a substrate having electrodes, and wherein the rockable mirror portion comprises individual driving electrodes opposed to the electrodes of the substrate, so that the mirror portion is rockable by electrostatic operation.

* * * * *